(12) United States Patent
Meisen

(10) Patent No.: US 6,689,206 B2
(45) Date of Patent: Feb. 10, 2004

(54) PROCESS FOR PRODUCING YELLOW IRON OXIDE PIGMENTS

(75) Inventor: Ulrich Meisen, Kall (DE)

(73) Assignee: Bayer Aktiengesellschaft, Leverkusen (DE)

( * ) Notice: Subject to any disclaimer, the term of this patent is extended or adjusted under 35 U.S.C. 154(b) by 61 days.

(21) Appl. No.: 09/945,423

(22) Filed: Aug. 31, 2001

(65) Prior Publication Data

US 2002/0088374 A1 Jul. 11, 2002

(30) Foreign Application Priority Data

Sep. 8, 2000 (DE) .......................... 100 44 398
Oct. 13, 2000 (DE) .......................... 100 50 682

(51) Int. Cl.$^7$ ............................ C01G 49/06; C09C 1/24
(52) U.S. Cl. ........................ 106/456; 426/632
(58) Field of Search ................. 106/456, 632; 423/632

(56) References Cited

U.S. PATENT DOCUMENTS

| 1,327,061 A | 1/1920 | Penniman, Jr. et al |
| 1,368,748 A | 2/1921 | Penniman, Jr. et al. |
| 2,558,304 A | 6/1951 | Marcot et al. |
| 4,459,276 A * | 7/1984 | Nobuoka et al. ............ 423/633 |
| 5,451,253 A | 9/1995 | Klingelhoefer et al. ..... 106/456 |
| 5,879,441 A | 3/1999 | Pitzer .......................... 106/456 |
| 5,916,360 A * | 6/1999 | Braun et al. ................. 106/456 |
| 6,027,559 A * | 2/2000 | Morii et al. ................. 106/456 |
| 6,042,642 A | 3/2000 | Braun et al. |
| 6,179,908 B1 | 1/2001 | Braun et al. ................. 106/456 |

FOREIGN PATENT DOCUMENTS

GB       1445288      8/1976

* cited by examiner

Primary Examiner—C. Melissa Koslow
(74) Attorney, Agent, or Firm—Godfried R. Akorli

(57) ABSTRACT

The present invention relates to a process for producing a yellow iron oxide pigments comprising the steps of I) mixing preprecipitated $FeCl_2$ and an $\alpha\text{-}FeOOH$ nucleus produced by the "alkali" process,
II) oxidizing the suspension in a first oxidation step at 20 to 45° C.
III) oxidizing the suspension in a first oxidation step at 55 to 85° C.

22 Claims, No Drawings

PROCESS FOR PRODUCING YELLOW IRON OXIDE PIGMENTS

BACKGROUND OF THE INVENTION

The present invention relates to a process for producing yellow iron oxide pigments from iron(II) chloride and an alkaline component by the precipitation process, wherein after addition of the α-FeOOH nucleus to the preprecipitated $FeCl_2$ the pH is 3 to 7.

The production of yellow iron oxide pigments by the precipitation process has been known for a long time. The typical course of this process is described, for example, in Ullmann's Encyclopedia of Industrial Chemistry, $5^{th}$ Ed., Vol. A20, p. 297 ff. The raw material generally used is iron(II) sulfate obtained during the pickling of steel sheets, or iron(II) sulfate formed during the production of titanium dioxide by the sulfate process. Large quantities of $FeCl_2$ are also obtained in the manufacture of synthetic rutile for the production of $TiO_2$.

However, an increased trend towards the use of hydrochloric acid as a mordant has been observable for years in the pickling industry. Due to its purity, the iron(II) chloride obtained here is particularly suitable for the production of yellow iron oxide. Furthermore, the so-called chloride process is being increasingly used worldwide for the production of titanium dioxide. Hence solutions containing iron(II) chloride, which as far as possible should be converted into a useful material, are increasingly being obtained from both sources. A common process for this conversion is the spray-roasting process, in which the iron(II) chloride or an iron(III) chloride at elevated temperatures (typically more than 1000° C.) is subjected to an oxidative hydrolysis. The end products formed here are iron oxide, typically haematite, and hydrochloric acid which, being the required useful material, is reintroduced into the pickling process. Without particular purification steps, the iron oxide obtained is suitable for the production of hard ferrites.

If soft ferrites are to be produced from such iron oxides, it is necessary to subject the iron chloride solution to additional purification operations, which makes the process significantly more expensive. As more and more iron chloride, for the most part of inferior quality, is becoming available, and the absorption capacity of the ferrite market is limited, an alternative process for the production of a useful material from this iron chloride is sought. A direct deposition or dumping of the iron chloride solutions is unacceptable for environmental reasons.

Accordingly, an object of the present invention was the conversion of iron chloride into a high-grade useful material.

In general, α-FeOOH (yellow iron oxide) is produced from iron(II) salts by the precipitation process (DE-A 2 455 158) or by the Penniman process (U.S. Pat. Nos. 1,368,748, 1,327,061). In both processes a nucleus is first of all produced, onto which, in a further step, additional α-FeOOH is allowed to grow relatively slowly. Unlike $FeSO_4$, $FeCl_2$ is usually not isolated as crystalline material, because its solubility in water is significantly higher than that of $FeSO_4$. It is therefore in many cases more highly contaminated than $FeSO_4$, which is in fact purified by the crystallization step. In addition, the $FeCl_2$ solution frequently contains organic constituents, which can greatly influence the crystallization process.

As iron(II) chloride solutions from steel pickling and from $TiO_2$ production frequently contain interfering quantities of cations of higher valency (for example, Ti, Cr, Al, V, Si), these have to be removed by precipitation using an alkaline component (EP-A 0 911 370). The resulting iron chloride has a pH of between 2 and 4.

It has been found that many iron(II) chloride solutions obtained from steel pickling do not lead to pure needle-shaped α-FeOOH when the so-called acid nucleation process is employed (see also EP-A 0 406 633, Example 1). Where $FeCl_2$ is used, instead of α-FeOOH, in many cases β-FeOOH in the form of very long, thin needles is obtained. During the subsequent pigment formation β-FeOOH partially decomposes to form α-$Fe_2O_3$, depending on the applied temperature (Chambaere, D. G. & De Grave, E., Phys. Chem. Minerals, 12, (1985), 176–184). Consequently, it not possible to use β-FeOOH as nucleus material for the production of α-FeOOH pigments.

In order for the $FeCl_2$ from steel pickling to be usable, the nucleus has to be produced by the "alkali process" (U.S. Pat. No. 2,558,304). If one now proceeds with an "alkaline" yellow nucleus in accordance with the known process for pigment formation, where preprecipitated $FeCl_2$ is used, the addition of the nucleus to the iron(II) chloride produces a pH of 5–7, which at temperatures of above 50° C. leads to unwanted black magnetite.

Accordingly, it is an object of the present invention was to find a process whereby yellow iron oxide pigment can be produced from preprecipitated $FeCl_2$ and from a nucleus produced by the alkali process.

SUMMARY OF THE INVENTION

1. The invention relates to a process for producing a yellow iron oxide pigments comprising the steps of
   I) mixing preprecipitated $FeCl_2$ and an α-FeOOH nucleus produced by the "alkali" process, wherein
      a. the Fe concentration of the $FeCl_2$ is between 70 and 220 g/l,
      b. the Fe(III) content of the $FeCl_2$ is less than 8 mol % Fe(III),
      c. the pH of the suspension after addition of the α-FeOOH nucleus (measured at 30° C.) is 3 to 7,
   II) oxidizing the suspension in a first oxidation step, wherein
      d. the temperature is 20 to 45° C.,
      e. the rate of oxidation in the first oxidation step is 0.5 to 10 mol % Fe(III) formed per hour,
      f. the pH (measured in suspension at 30° C.) at which the first oxidation step is ends is between 1.5 and 3.0, and
   III) oxidizing the suspension in a second oxidation step, wherein
      g. the temperature is 55 to 85° C.,
      h. the pH is increased at a rate of 0.05 to 1.0 pH/h by continuous addition of an alkaline component,
      i. the end point of the rise in the pH in the second oxidation step is pH 2.4 to 5.2,
      j. the rate of oxidation in the second oxidation step is 0.2 to 10 mol % Fe(III) formed per hour,
      k. the rate of circulation of the suspension during the reaction, based on the final volume of the batch, is between 1 and 15 times per hour.

DETAILED DESCRIPTION OF THE INVENTION

The invention preferably relates to a process where the following parameters can be adjusted:

a. the Fe concentration of the iron component used is between 85 and 130 g/l,
b. the Fe(III) content of the Fe component used is 0.1 to 2.5 mol % Fe(III),
c. the pH of the suspension after addition of the alkaline yellow nucleus (measured at 30° C.) is 4 to 6,
d. the temperature in the first oxidation step is 30 to 40° C.,
e. the rate of oxidation in the first oxidation step is 4 to 7 mol % Fe(III) formed per hour,
f. the pH (measured in suspension at 30° C.) at which the first oxidation step is carried out is between 2.4 and 2.8,
g. the temperature in the second oxidation step is 60 to 75° C.,
h. the pH in the second oxidation step is increased at a rate of 0.1 to 0.8 pH/h, by continuous addition of an alkaline component,
i. the end point of the rise in the pH in the second oxidation step is pH 2.8 to 4.2,
j. the rate of oxidation in the second oxidation step is 0.4 to 4 mol % Fe(III) formed per hour,
k. the rate of circulation of the suspension during the reaction, based on the final volume of the batch, is 1 and 3 times per hour.

The process according to the invention can contain the following steps:

Preprecipitation (not necessary if the FeCl$_2$ used is of high purity)

Sodium hydroxide solution is added, with intensive stirring, to an iron(II) chloride solution with an FeCl$_2$ content of between 50 and 450 g/l, in a quantity sufficient to establish a pH of 3 to 5. Instead of sodium hydroxide solution, other alkaline components can be used including Ca(OH)$_2$, Na$_2$CO$_3$ or ammonia. Moreover, the sedimentation behavior of the accumulating hydroxide slurry or carbonate slurry can be improved by the addition of a flocculation aid. Suitable flocculation aids include the known polyacrylates or other similarly acting substances. Sedimentation behavior may optionally be improved by a subsequent oxidation, resulting in the conversion of various metal cations into oxides or oxyhydroxides of higher valency, which are more easily separable.

The hydroxide slurry can be removed by sedimentation, filtration or separation using a separator, the selection of the suitable apparatus or of the suitable method depending on the exact experimental conditions, the flow rates and the raw materials used.

Production of Nuclei by the Alkali Process

To produce an α-FeOOH nucleus by the alkali process, it is advantageous to use batch-operated stirred-tank reactors, continuous-flow stirred-tank reactors, emitter reactors (without stirrer), loop reactors or tubular reactors.

An Fe component with a concentration of 21 to 150 g/l Fe, preferably 44 to 132 g/l Fe, is added with thorough mixing, over a period of 15 to 95 minutes, preferably 30 to 55 minutes, to a solution of an alkaline component (typically sodium hydroxide solution, sodium carbonate, Ca(OH)$_2$ et cetera). The concentration of the alkaline component is 3–15 equivalents per liter (based on the stoichiometry of the reaction for the nucleus formation). The quantity of alkaline precipitating agent is between 120 and 350% of the stoichiometry; preferably 150 to 250% of the required stoichiometry. The precipitation is carried out at temperatures between 30° C. and 60° C., preferably 34° C. to 47° C.

The subsequent oxidation takes place at a rate of 5 to 50 mol % Fe(III)/h, preferably 15 to 30 mol % Fe(III)/h. When all the Fe(II) has been oxidized to Fe(III) (α-FeOOH), the nucleus obtained, after examination (particle size), is used for pigment production without further isolation.

Pigment Formation

Batch-operated stirred-tank reactors, reactors with emitters (two-component nozzles, liquid, gas) loop reactors or bubble columns are particularly suitable for pigment formation. The alkaline nucleus is pumped over a period of 10 to 120 minutes into a solution of an Fe(II) component with an Fe content of 70 to 220 g/l Fe, preferably 85 to 130 g/l Fe. Depending on the ratio of Fe in the nucleus to Fe in the Fe(II) component, excess alkaline component in the nucleus and pH of the Fe component used, a pH of between 3 and 7 (measured at 30° C.) is established.

Preferably preprecipitated FeCl$_2$ having a pH of 2 to 4 is used. At the end of the pumping process, the mixture is heated to the first oxidation temperature of 20 to 45° C., preferably 30 to 40° C. Oxidation is then carried out using an oxidizing agent at a rate of 0.5 to 10 mol %/h Fe(III) formed, preferably 4 to 7 mol %/h. This step is continued until all the Fe(OH)$_2$ formed by the mixing together of the alkaline yellow nucleus and the Fe component has been oxidized to α-FeOOH, which is the case at a pH of 1.5 to 3.0. This is followed by heating to a temperature of 55° C. to 85° C., preferably 60° C. to 75° C.

When this temperature has been attained, the pH is increased at a rate of 0.05 to 1.0 pH/h, preferably 0.1 to 0.8 pH/h, by means of continuous addition of an alkaline precipitating agent. At the same time, an oxidizing agent is added continuously at a speed such that the rate of oxidation is between 0.2 and 10 mol %, preferably between 0.4 and 4 mol %, of Fe(III) formed per hour.

The pH is raised no further than pH 2.4 to 5.2, preferably pH 2.8 to 4.2, and the pH is then maintained at this value until the end of the reaction. In order to avoid sedimentation the rate of circulation throughout the entire reaction is between 1 and 15 times the final volume of the reaction.

Depending on the reaction conditions chosen, light or dark yellow pigments are obtained. The most important controlling parameters are shown in the following Table:

| Parameter | "light pigment" | "dark pigment" |
| --- | --- | --- |
| nucleus | fine | coarse |
| temperature | 55–75° C. | 60–85° C. |
| end pH | 2.4–3.8 | 3.2–5.2 |
| oxidation | slow | rapid |

Oxidizing agents which can be used, include:
  atmospheric oxygen
  pure oxygen
  ozone
  H$_2$O$_2$
  sodium hypochlorite or bleach liquor or calcium hypochlorite
  chlorates(III) or chlorates(V)
  perchlorates
  nitrates
  chlorine The oxidation is concluded as soon as the Fe(II) content of the suspension is less than 1 mol %. A further oxidation to 100% conversion is of less use economically, but can definitely be achieved.

Suitable alkaline components include:
- alkali metal hydroxides
- alkali metal carbonates
- alkaline-earth metal hydroxides
- alkaline-earth metal oxides
- alkaline-earth metal carbonates
- ammonia (as solution or gas)
- organic N bases (in special cases)

Sparingly soluble compounds (for example, $MgCO_3$) are used in the form of aqueous slurries. Combinations such that sparingly soluble secondary products would be formed during the reaction should not be used.

Stoichiometry of the Reaction

The nucleus production and the pigment formation take place according to the following stoichiometry:

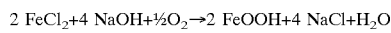

or

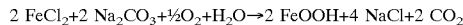

If insufficient suitable iron(II) chloride is available, then, both during the nucleus production and during the pigment production, the iron(II) chloride may be partially replaced by iron(II) sulfate or by another economical source of Fe. But the preferred embodiment is the exclusive use of iron(II) chloride.

It is also possible to reduce iron(III) chloride obtained during the production of $TiO_2$ by the chloride process to iron(II) chloride by means of metallic iron. This iron(II) chloride solution can then be subjected to the purification by preprecipitation described above.

The yellow iron oxide pigment obtained is particularly suitable for coloring plastics or paper, or for the production of emulsion paints or other coatings and paints.

By suitably varying the specified production conditions, the person skilled in the art will be able to create a broad palette of yellow iron oxide pigments of various particle sizes and hence of various tones.

The pigment can be isolated from the pigment suspension by the known steps of filtration, drying and grinding.

The determination of the properties given in the Examples is carried out as stated in EP-A 0 911 370 (corresponding to U.S. Pat. No. 6,042,642 hereby incorporated by reference).

The invention is described below by means of Examples, but these are in no way intended to be limiting.

EXAMPLE 1

Preprecipitation of the Iron(II) Component 180 liters of $FeCl_2$ having an Fe content of 90.5 g/l was placed in a mixing vessel. Under conditions of constant stirring and circulation, over a period of 248 minutes the pH was raised from 0 to 4.5 by pH-controlled pumping in of sodium hydroxide solution with a content of 100 g/l. On conclusion of the addition of NaOH, a solution of 10 g Praestol 2100L (flocculation aid, Stockhausen GmbH, DE) in 5000 ml water was added over a period of 5 minutes. After the addition of the flocculation aid, stirring and circulation were continued for 30 minutes and the reaction was then left to stand for 24 hours. The clear phase was then drawn off through a displaceable immersed tube. The accumulating slurry, which consisted substantially of $FeCl_2$, $Fe(OH)_3$, $Al(OH)_3$ and $Cr(OH)_3$, could be used in small quantities in the production of standard grades of yellow iron oxide or black iron oxide.

The $FeCl_2$ solution obtained had the following properties:

| | |
|---|---|
| Fe content [g/l]: | 84.5 |
| Fe(III) content [mol %]: | 0.3 |
| Mn content [wt. % based on Fe]: | 0.363 |
| Cr content [wt. % based on Fe]: | 0.004 |
| Cu content [wt. % based on Fe]: | 0.001 |
| Si content [wt. % based on Fe]: | 0.009 |
| Al content [wt. % based on Fe]: | 0.04 |
| pH (at 25° C.): | 3.7 |

EXAMPLE 2

Preprecipitation of the Iron(II) Component 180 liters of $FeCl_2$ having an Fe content of 115.3 g/l was preprecipitated as described in Example 1.

The $FeCl_2$ solution obtained had the following properties:

| | |
|---|---|
| Fe content [g/l]: | 104.0 |
| Fe(III) content [mol %]: | 0.23 |
| Mn content [wt. % based on Fe]: | 0.368 |
| Cr content [wt. % based on Fe]: | 0.001 |
| Cu content [wt. % based on Fe]: | 0.014 |
| Si content [wt. % based on Fe]: | 0.018 |
| Al content [wt. % based on Fe]: | 0.001 |
| pH (at 25° C.): | 3.5 |

EXAMPLE 3

Comparative Experiment: $FeCl_2$ without Preprecipitation

The $FeCl_2$ solution used had the following properties:

| | |
|---|---|
| Fe content [g/l]: | 107.8 |
| Fe(III) content [mol %]: | 0.9 |
| Mn content [wt. % based on Fe]: | 0.338 |
| Cr content [wt. % based on Fe]: | 0.064 |
| Cu content [wt. % based on Fe]: | 0.025 |
| Si content [wt. % based on Fe]: | 0.027 |
| Al content [wt. % based on Fe]: | 0.083 |
| pH (at 25° C.): | −0.1 |

EXAMPLE 4

Production of an Alkaline Yellow Nucleus 15 mol $FeCl_2$ from Example 1 was placed in a 30 liter stirred-tank reactor provided with 3-stage cross-arm paddle mixer, aeration via aeration ring below the stirrer of electrical jacket heating, jacket cooling, pH measurement, redox measurement and temperature measurement.

5065 ml water was added to this solution, so as to establish an Fe concentration of 55 g/l Fe. The solution was heated to the precipitation temperature of 44° C., with constant stirring (speed 831 l/min). As soon as this temperature had been attained, $Fe(OH)_2$ was precipitated by pumping in a solution of 45 mol NaOH (=1800 g) dissolved in 6000 ml water (300 g/l=7.5 equivalents per liter) over a period of 40 minutes. The quantity of NaOH was thus 150% of the stoichiometry. On conclusion of the precipitation, the solution was aerated with 525 Nl/h of air. The oxidation time was 248 minutes, which corresponds to a rate of oxidation of 24.2 mol % Fe(III) per hour.

The alkaline yellow nucleus obtained had the following properties:

| BET surface area [m²/g]: | 53 |
| --- | --- |
| Size of crystallite [nm]: | 13 |
| α-FeOOH content [g/l]: | 62.8 |
| NaOH content [g/l]: | 28.3 |

EXAMPLE 5
Production of an Alkaline Yellow Nucleus 12000 ml NaOH solution with a content of 100 g/l (=2.5 equivalents per liter) was placed in a 30 liter stirred-tank reactor provided with 3-stage cross-arm paddle mixer, aeration via aeration ring below the stirrer of electrical jacket heating, jacket cooling, pH measurement, redox measurement and temperature measurement. The solution was heated to the precipitation temperature of 36° C., with constant stirring (speed 594 l/min). As soon as this temperature had been attained, Fe(OH)$_2$ was precipitated by pumping in a solution of 10 mol FeCl$_2$ from Example 2 (=1267 g FeCl$_2$) dissolved in 12675 ml water (100 g/l FeCl$_2$=44.1 g/l Fe) over a period of 39 minutes. The quantity of NaOH was thus 150% of the stoichiometry. On conclusion of the precipitation, the solution was aerated with 100 Nl/h of air. The oxidation time was 225 minutes, which corresponds to a rate of oxidation of 26.7 mol % Fe(III)/h.

The alkaline yellow nucleus obtained had the following properties:

| BET surface area [m²/g]: | 61 |
| --- | --- |
| Size of crystallite [nm]: | 12 |
| α-FeOOH content [g/l]: | 36.0 |
| NaOH content [g/l]: | 16.2 |

EXAMPLE 6
Production of an Alkaline Yellow Nucleus

The procedure was as indicated in Example 5, but precipitation took place at a temperature of 44° C. The oxidation time was 217 minutes, which corresponds to a rate of oxidation of 27.6 mol % Fe(III)/h.

The alkaline yellow nucleus obtained had the following properties:

| BET surface area [m²/g]: | 48 |
| --- | --- |
| Size of crystallite [nm]: | 15 |
| α-FeOOH content [g/l]: | 36.0 |
| NaOH content [g/l]: | 16.2 |

EXAMPLE 7
Comparative Experiment: Production of an Alkaline Yellow Nucleus

The procedure was as indicated in Example 5, but an FeCl$_2$ which had not been preprecipitated was used, as described in Example 3. The oxidation time was 226 minutes, which corresponds to a rate of oxidation of 26.7 mol % Fe(III)/h.

The alkaline yellow nucleus obtained had the following properties:

| BET surface area [m²/g]: | 61 |
| --- | --- |
| Size of crystallite [nm]: | 12 |
| α-FeOOH content [g/l]: | 35.4 |
| NaOH content [g/l]: | 16.2 |

EXAMPLE 8
Production of a Yellow Iron Oxide Pigment 18 mol of preprecipitated FeCl$_2$ from Example 1 (Fe content: 84.5 g/l, Fe(III) content: 0.3 mol %, pH: 3.7) was placed in a 30 liter stirred-tank reactor provided with 3-stage cross-arm paddle mixer, aeration via aeration ring below the stirrer of electrical jacket heating, jacket cooling, pH measurement, redox measurement and temperature measurement. 4936 ml of yellow nucleus suspension from Example 5 (=2.0 mol FeOOH and 2.0 mol NaOH) was pumped in over 30 minutes, with constant stirring (speed 831 l/min). After the pumping, the pH (measured at 30° C.) was 5.5. The mixture was then heated to 34° C. and when this temperature had been attained, the first oxidation step was started by aeration with 36 Nl/h air. After 60 minutes, the pH (measured at 30° C.) was 2.5.

The rate of oxidation in the first oxidation step was 5.6 mol % Fe(III) formed per hour. The mixture was then heated to 60° C. and the second oxidation step was started with 36 Nl/h air. As soon as this temperature had been attained, pH-controlled sodium hydroxide solution with a content of 300 g/l (=7.5 equivalents per liter) was pumped in. The pH increased at a rate of 0.2 pH/h; the end point of the rise in pH was pH 3.4. When this pH had been attained, the pH was maintained constant at 3.4+/−0.2 by means of sodium hydroxide solution. The rate of oxidation in the second oxidation step was 0.47 mol % Fe(III) formed per hour. The duration of the second oxidation step was 2140 minutes. The circulation performance of the stirrer, based on the final volume of 22 liters, was 13.6 per hour. During the oxidation, samples were withdrawn, filtered, washed and dried and their tristimulus values determined.

| Sample No. | Oxidation time | Full shade L64, compared with Bayferrox 3910 | | | Brightening L64, compared with Bayferrox 3910 | | |
| --- | --- | --- | --- | --- | --- | --- | --- |
| | | dL* | da* | db* | FS [%] | da* | db* |
| B8/A | 11 h | 2.9 | −4.2 | −6.4 | 91 | −0.6 | 0.9 |
| B8/B | 16 h | 3.1 | −2.6 | −3.0 | 90 | −0.2 | 0.7 |
| B8/C | 19.5 h | 2.9 | −1.8 | −1.4 | 94 | 0.0 | 0.1 |
| B8/D | 24 h | 2.7 | −1.3 | −1.0 | 94 | 0.0 | −0.2 |
| B9/End | 35.677 h | 1.8 | −1.0 | −0.7 | 96 | 0.0 | −1.2 |

EXAMPLE 9
Production of a Yellow Iron Oxide Pigment

The procedure here was as in Example 8, with the following differences:

18.9 mol preprecipitated FeCl$_2$ from Example 2 was used and adjusted to 200 g/l FeCl$_2$ with water. 5183 ml of yellow nucleus suspension (=2.1 mol FeOOH and 2.1 mol NaOH). pH after addition of nucleus 6.2 (measured at 30° C.).

First oxidation step with 38 Nl/h air, duration of oxidation 59 minutes, rate of oxidation 5.6 mol % Fe(III)/h.

During the oxidation, samples were withdrawn, filtered, washed and dried and their tristimulus values determined.

| Sample No. | Oxidation time | Full shade L64, compared with Bayferrox 3910 | | | Brightening L64, compared with Bayferrox 3910 | | |
|---|---|---|---|---|---|---|---|
| | | dL* | da* | db* | FS [%] | da* | db* |
| B9/A | 13 h | 1.3 | −6.0 | −12.2 | 89 | −1.2 | 0.7 |
| B9/B | 18 h | 3.1 | −5.1 | −8.0 | 89 | −0.9 | 1.0 |
| B9/C | 21.5 h | 3.7 | −4.0 | −4.9 | 90 | −0.8 | 0.8 |
| B9/D | 26 h | 3.8 | −3.0 | −2.8 | 89 | −0.5 | 1.3 |
| B9/E | 32 h | 3.4 | −2.0 | −1.3 | 91 | −0.3 | 0.8 |
| B8/End | 35.677 h | 2.8 | −1.6 | −0.9 | 92 | −0.3 | 0.5 |

EXAMPLE 10

Production of a Yellow Iron Oxide Pigment

The procedure here was as in Example 9, but the yellow nucleus from Example 6 was used.

pH after addition of nucleus 6.2 (measured at 30° C.).

First oxidation step with 38 Nl/h air, duration of oxidation 92 minutes, rate of oxidation 3.6 mol % Fe(III)/h.

Rate of oxidation of second oxidation step 0.42 mol % Fe(III)/h.

During the oxidation, samples were withdrawn, filtered, washed and dried and their tristimulus values determined.

| Sample No. | Oxidation time | Full shade L64, compared with Bayferrox 3910 | | | Brightening L64, compared with Bayferrox 3910 | | |
|---|---|---|---|---|---|---|---|
| | | dL* | da* | db* | FS [%] | da* | db* |
| B10/A | 13 h | 3.1 | −4.6 | −7.4 | 92 | −0.8 | 0.3 |
| B10/B | 17.6 h | 3.3 | −3.1 | −3.9 | 92 | −0.5 | 0.1 |
| B10/C | 23.3 h | 3.0 | −2.0 | −2.0 | 93 | −0.3 | 0.2 |
| B10/D | 31 h | 2.6 | −1.2 | −0.7 | 94 | −0.1 | −0.5 |
| B10/End | 42.677 h | 1.5 | −0.4 | −0.4 | 97 | 0.1 | −1.8 |

EXAMPLE 11

Production of a Yellow Iron Oxide Pigment

The procedure here was as in Example 8, but the yellow nucleus from Example 4 was used. The FeCl$_2$ described in Example 1 was used. The differences from Example 8 are shown in the following Table. Conditions of measurement and other conditions were as described in Example 8.

| | |
|---|---|
| Quantity of nucleus: | 2.0 mol |
| Quantity of FeCl$_2$: | 18.8 mol |
| pH prior to first oxidation: | 5.5 |
| Temperature of first oxidation: | 35° C. |
| Rate of first oxidation: | 5.2 mol % Fe(III)/h |
| pH after first oxidation: | 2.2 |
| Quantity of air in 2nd oxidation: | 12 NI/h |
| Temperature of 2nd oxidation: | 75° C. |
| Rate of 2nd oxidation: | 3.6 mol % Fe(III)/h |

During the oxidation, samples were withdrawn, filtered, washed and dried and their tristimulus values determined.

| Sample No. | Oxidation time | Full shade L64, compared with Bayferrox 3905 | | | Brightening L64, compared with Bayferrox 3905 | | |
|---|---|---|---|---|---|---|---|
| | | dL* | Da* | db* | FS [%] | da* | db* |
| B11/A | 5 h | 0.9 | −4.4 | −11.3 | 96 | −0.8 | −0.8 |
| B11/B | 9 h | 3.0 | −2.4 | −4.0 | 95 | −0.2 | −0.7 |
| B11/C | 18.3 h | 1.9 | −0.1 | −0.8 | 98 | 0.2 | −2.4 |
| B11/D | 19 h | 1.5 | 0.2 | −0.5 | 98 | 0.4 | −2.7 |
| B11/E | 21 h | 1.1 | 0.6 | −0.4 | 99 | 0.5 | −3.3 |
| B11/End | 28 h | 0.6 | 0.6 | −0.7 | 101 | 0.5 | −3.8 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed:

1. A process for producing yellow iron oxide pigments comprising the steps of
    (I) adding an α-FeOOH nucleus, produced by precipitation from a suspension containing an amount of alkaline precipitating agent between 120% and 350% of the stoichiometry, to a precipitated FeCl$_2$ solution to form a suspension wherein
        a. the Fe concentration of the FeCl$_2$ is between 70 and 220 g/l,
        b. the Fe(III) content of the FeCl$_2$ is less than 8 mol % Fe(III),
        c. the pH of the suspension after addition of the α-FeOOH nucleus to the precipitated FeCl$_2$ solution (measured at 30° C.) is 3 to 7,
    II) oxidizing the suspension in a first oxidation step, wherein
        d. the temperature is 20 to 45° C.,
        e. the rate of oxidation in this first oxidation step is 0.5 to 10 mol % Fe(III) formed per hour,
        f. the pH (measured in suspension at 30° C.) at which this first oxidation step is terminated is between 1.5 and 3.0, and
    III) oxidizing the suspension in a second oxidation step, wherein
        g. the temperature is 55 to 85° C.,
        h. the pH is increased at a rate of 0.05 to 1.0 pH/h by continuous addition of an alkaline component,
        i. the end point of the rise in the pH in this second oxidation step is pH 2.4 to 5.2.
        j. the rate of oxidation in this second oxidation step is 0.2 to 10 mol % Fe(III) formed per hour,
        k. the rate of circulation of the suspension during the reaction, based on the final volume of the batch, is between 1 and 15 times per hour.
2. The process of claim 1 wherein
    a. the Fe concentration of the FeCl$_2$ is between 85 and 130 g/l.
3. The process of claim 1 wherein
    b. the Fe(III) content of the FeCl$_2$ is between 0.1 to 2.5 mol % Fe(III).
4. The process of claim 1 wherein
    c. the pH of the suspension after addition of the α-FeOOH nuclei (measured at 30° C. ) is 4 to 6.
5. The process of claim 1 wherein
    d. the temperature in the first oxidation step is 30 to 40° C.
6. The process of claim 1 wherein
    e. the rate of oxidation in the first oxidation step is 4 to 7 mol % Fe(III) formed per hour.

7. The process of claim 1 wherein
f. the pH (measured in suspension at 30° C.) at which the first oxidation step is terminated is between 2.4 and 2.8.

8. The process of claim 1 wherein
g. the temperature in the second oxidation step is 60 to 75° C.

9. The process of claim 1 wherein
h. the pH in the second oxidation step is increased at a rate of 0.1 to 0.8 pH/h by continuous addition of an alkaline component.

10. The process of claim 1 wherein
i. the end point of the rise in the pH in the second oxidation step is 2.8 to 4.2.

11. The process of claim 1 wherein
j. the rate of oxidation in the second oxidation step is 0.4 to 4 mol % Fe(III) formed per hour.

12. The process of claim 1 wherein
k. the rate of circulation of the suspension during the reaction, based on the final volume of the batch, is between 1 and 3 times per hour.

13. The process of claim 1 wherein the α-FeOOH is produced under the following conditions:
$a_{NUC}$. the precipitation temperature is between 30 and 60° C.,
$b_{NUC}$. the rate of oxidation is 5 to 50 mol % Fe(III) per hour,
$c_{NUC}$. the amount of alkaline precipitating agent is between 120% and 350% of the stoichiometry.
$d_{NUC}$. the concentration of the Fe component is between 21 and 150 g/l Fe,
$e_{NUC}$. the concentration of the alkaline component is between 1.25 and 15 equivalents per liter,
$f_{NUC}$. the precipitation time of the Fe(OH)$_2$ is 15 to 95 minutes.

14. The process of claim 13 wherein:
$a_{NUC}$. the precipitation temperature is between 34 and 47° C.

15. The process of claim 13 wherein:
$b_{NUC}$. the rate of oxidation is 15 to 30 mol % Fe(III) per hour.

16. The process of claim 13 wherein:
$c_{NUC}$. the amount of alkaline precipitating agent is between 150% and 250% of the stoichiometry.

17. The process of claim 13 wherein:
$d_{NUC}$. the concentration of the Fe component is between 44 and 132 g/l Fe.

18. The process of claim 13 wherein:
$e_{NUC}$. the concentration of the alkaline component is between 2.5 and 7.5 equivalents per liter.

19. The process of claim 13 wherein:
$f_{NUC}$. the precipitation time of the Fe(OH)$_2$ is 30 to 55 minutes.

20. The process of claim 1 wherein the preprecipitation FeCl$_2$ solution is produced by the steps of using an alkaline component, adding a flocculation aid, mixing thoroughly until a pH of 3 to 5 has been attained, and subsequently separating the slurry formed.

21. The process of claim 1 wherein the alkaline component used in sodium hydroxide solution, sodium carbonate, magnesium carbonate, MgO, Mg(OH)$_2$, CaO, Ca(OH)$_2$, or ammonia.

22. The process of claim 1 wherein oxidation is conducted with an oxidizing agent which is atmospheric oxygen, O$_2$, O$_2$, H$_2$O$_2$, Cl$_2$, chlorates (I) to chlorates (VII) or nitrates.

* * * * *